No Printed Specification Availabl
9837X
Kerr & Hoover.
Alcohol Still.
Patented Jul. 1, 1836.
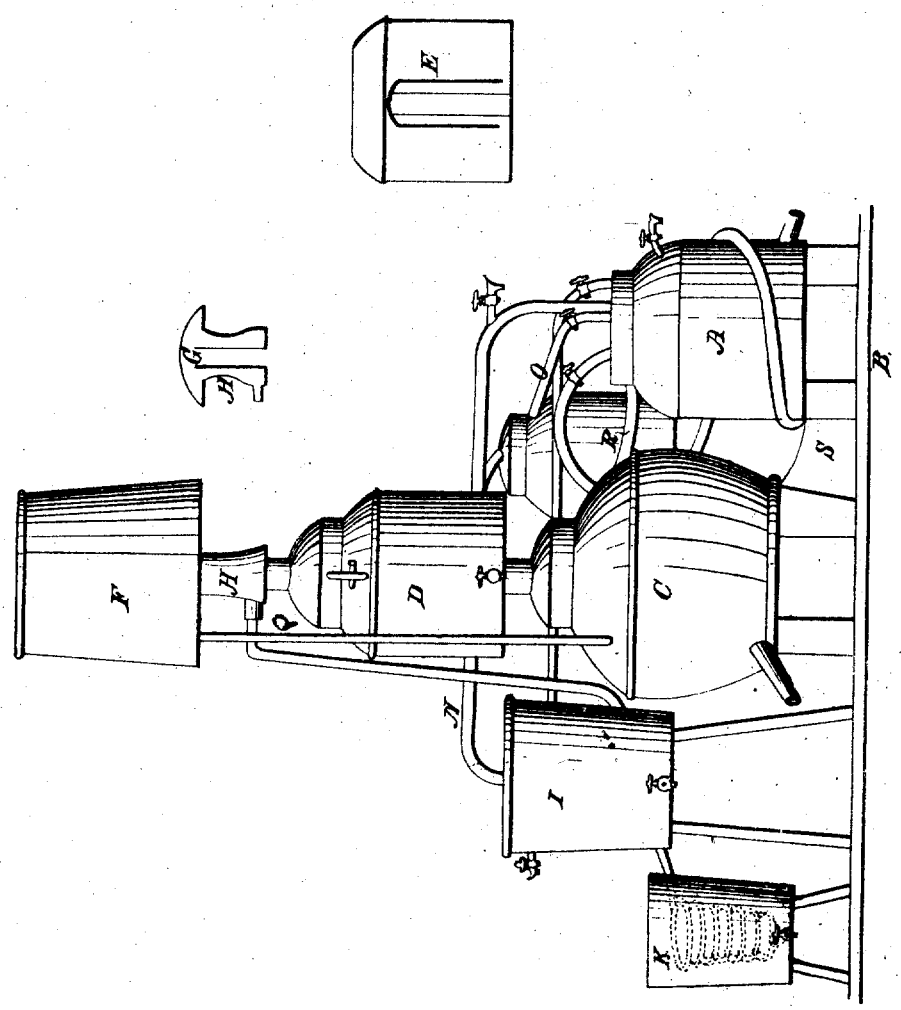
NO PRINTED COPY OF SPECIFICATION IN OFFICE.

9837X July 1, 1836 465.

Andrew R Kerr & Henry Hoover Waynesboro Penn.

Letters Patent

The schedule referred to in these Letters Patent and making part of the same contain-ing a description of the same in the words of the said Andrew R Kerr & Henry Hoover themselves of their improvement in the method of distilling Spiritous Liquors Be it known that we Andrew Kerr and Henry Hoover of Waynesboro in the County of Franklin and State of Pennsylvania have made a new and useful improvement in the method of distilling Spiritous Liquors which is described as follows, refer-ring back to the annexed drawings of the same, making part of this specification.

This improvement is designed principally to save expense in fuel and labour. It is effected by using steam to heat the singlings, doub-lings and water contained in the several tubs stills and kettles which were form-erly heated by separate fires in the present mode one fire being used for heating the water in the main boiler which generates the steam required for the above pur-poses. A is the main boiler for generating the steam. B the furnace. C the singling still. D doubling still containing the reversed heater E the reversed heater F the globe tub G the globe. H the pitcher I the water heater K the cooler L the doubling still which may be heated by fire as well as steam M. steam pipe to boil the [illegible] N pipe to boil the water O pipe to boil the doubler P pipe to feed the boiler from the water heater Q charging pipe to charge the singling still from the glo-be tub R [illegible] flue passing around the boiler and doubling still S [illegible] flue from the furnace to the singling still.

The singling and doubling still may be partly heated by the fire by means of the fire and smoke passing under and around them in the flues before mentioned. What we claim as our invention and which we desire to secure by Letters Patent consists in the before described method of distilling Spiritu-ous Liquors Andrew R Kerr
Henry Hoover Witnesses. Wm. [illegible] Elliot
Peter Hoover 390 [illegible]

(Drawing in the Port folio)

[illegible]